United States Patent
Nakajima

[11] Patent Number: 5,949,151
[45] Date of Patent: Sep. 7, 1999

[54] ANTITHEFT APPARATUS FOR A VEHICLE

[75] Inventor: Yoshiyuki Nakajima, Saitama, Japan

[73] Assignee: Honda Giken Kogyo Kabushiki Kaisha, Tokyo, Japan

[21] Appl. No.: 08/932,432

[22] Filed: Sep. 17, 1997

[30] Foreign Application Priority Data

Sep. 17, 1996 [JP] Japan ................................ 8-245095

[51] Int. Cl.⁶ ................................................ B60R 25/04
[52] U.S. Cl. .................... 307/10.3; 180/287; 340/825.72
[58] Field of Search ................... 307/10.1–10.6; 123/198 B, 198 DB, 198 DC, 146.5 A; 340/425.5, 426, 428, 441, 825.32, 825.31, 825.34, 825.69, 825.72; 180/287; 701/1, 36, 49

[56] References Cited

U.S. PATENT DOCUMENTS 5,440,177  8/1995  Bellin et al. .......................... 307/10.5
5,554,891  9/1996  Shimizu et al. ....................... 307/10.2
5,623,245  4/1997  Gilmore ............................... 307/10.2
5,811,886  9/1998  Majmudar ............................ 307/10.2

FOREIGN PATENT DOCUMENTS

A-6-286583  10/1994  Japan .

Primary Examiner—Richard T. Elms
Attorney, Agent, or Firm—Birch, Stewart, Kolasch & Birch, LLP

[57] ABSTRACT

An electronic control member for preventing the stealing of a vehicle and an electronic control member for controlling ignition timing of an ignition device formed integrally and disposed in one package to thereby provide an antitheft apparatus for a vehicle which is small, economical, and highly capable of preventing theft. The antitheft apparatus for a vehicle includes an immobilizer, an antitheft electronic control member, an ignition device, a sensor, a remote control member and an alarm member.

23 Claims, 3 Drawing Sheets

ANTITHEFT APPARATUS FOR A VEHICLE

BACKGROUND OF THE INVENTION

1. Field of the Invention

The present invention relates to an antitheft apparatus for a vehicle. More particularly, the present invention is directed to an antitheft apparatus for a vehicle comprising electronic control means for preventing theft of a vehicle and electronic control means for controlling ignition timing of an ignition device formed integrally and disposed in one package. Hence, the present invention is small, economical, and highly capable of preventing theft.

2. Description of the Background Art

As a prior art antitheft apparatus for a vehicle, there is known a type of antitheft apparatus, as disclosed for example in the gazette of Japanese Patent Laid-open No. Hei 6-286583, so arranged that such an abnormality that the power circuit from the power supply to the ignition device is made or broken by a key operation, the switch mechanism of the ignition switch for controlling the traveling of the vehicle is broken or removed, or the like is detected by a sensor and, thereupon, the function of at least one component of the ignition device is controlled, i.e., the ignition device is made inoperable and the starting of the engine is made impossible.

Also, such an antitheft apparatus for a vehicle is known in which various functions for preventing theft are controlled by remote control.

Further, an antitheft apparatus for a vehicle is known in which a lock cable is attachable and detachable by a key operation which is used for engaging a vehicle with a suitable structure to thereby prevent the vehicle from being stolen.

In the antitheft apparatus for a vehicle disclosed in the gazette of Japanese Patent Laid-open No. Hei 6-286583, the electronic control means includes a CPU (Central Processor Unit) for preventing theft and the electronic control means for controlling the ignition timing of the ignition device to start the vehicle engine are designed to function independently of each other and they are not formed integrally. Therefore, there is the possibility that either of the electronic control means starts to perform other functions than are desired.

Further, in the prior art antitheft apparatus for a vehicle in which various functions for preventing theft are controlled by remote control, since the electronic circuit portion of the receiver portion for the remote controlling installed on the side of the vehicle is not integrally formed with the electronic control means of the antitheft apparatus for the vehicle, there is present an independent wiring connecting the receiver portion to the electronic control means of the antitheft apparatus for a vehicle. Therefore, there has been such a possibility that a physical load is placed on the wiring and a short circuit or the like is caused and a malfunction occurs.

Further, in the prior art antitheft apparatus for a vehicle in which a lock cable is used, since the electronic control means detecting breakage of the lock cable for coping with theft is not integrally formed with the electronic control means of the antitheft apparatus for the vehicle, there is present an independent wiring connecting the electronic control means of the lock cable to the electronic control means of the antitheft apparatus for the vehicle. Therefore, there has been such a possibility that a physical load is placed on the wiring and a short circuit or the like is caused and a malfunction occurs.

SUMMARY AND OBJECTS OF THE INVENTION

The present invention has been made to solve the above mentioned technical problems and it is an object of the invention to provide an antitheft apparatus for a vehicle having an electronic control means for preventing theft of the vehicle and electronic control means for controlling ignition timing of an ignition device formed integrally and disposed in one package and, therefore, being small, economical, and highly capable of preventing theft.

In order to achieve the above mentioned object, the antitheft apparatus for a vehicle according to the invention includes an antitheft electronic control means integrally formed of electronic control means responsive to a signal generated upon detection of an unauthorized operation of a vehicle for preventing the vehicle from being stolen and electronic control means for controlling ignition timing of an ignition device starting the engine of the vehicle.

Since the antitheft apparatus for a vehicle according to the invention comprises antitheft electronic control means integrally formed of electronic control means responsive to a signal generated upon detection of an unauthorized operation of a vehicle for preventing the vehicle from being stolen and electronic control means for controlling ignition timing of an ignition device starting the engine of the vehicle, it can dispose the antitheft electronic control means on the same substrate and in one package.

Further, the antitheft electronic control means according to the invention is characterized by that it integrally comprises an electronic circuit portion of the receiving portion of a remote control means for controlling the antitheft apparatus for a vehicle to be operable/inoperable.

Since the antitheft electronic control means according to the invention integrally comprises an electronic circuit portion of the receiving portion of a remote control means for controlling the antitheft apparatus for the vehicle to be operable/inoperable, both the members can be disposed on the same substrate and in one package, and accordingly it is made very difficult to place a physical load between the input and the output of the antitheft electronic control means and the electronic circuit portion of the receiving portion.

Further, the antitheft apparatus for a vehicle according to the invention is characterized by that it comprises lock means for engaging a structural member of the vehicle to another structural member of the vehicle or a structural member of a body other than the vehicle, lock control means for controlling the lock means, and alarm means for sounding an alarm upon detection of unauthorized unlocking of the lock means, in which the lock control means and the antitheft electronic control means are formed integral.

Since the antitheft apparatus for a vehicle according to the invention comprises lock means for engaging a structural member of the vehicle to another structural member of the vehicle or a structural member of a body other than the vehicle, lock control means for controlling the lock means, and alarm means for sounding an alarm upon detection of unauthorized unlocking of the lock means, in which the lock control means and the antitheft electronic control means are formed integrally, the lock control means and the antitheft electronic control means can be disposed on the same substrate and in one package. Accordingly it is very difficult to place a physical load between the input and the output of the lock control means and the antitheft electronic control means so that the capability of preventing theft can be improved.

Further, the antitheft apparatus for a vehicle according to the invention is characterized by that it comprises connection means for electrically and mechanically connecting thereto a lock cable disengageable by a key operation for engaging the vehicle with a suitable structural member to prevent the same from being stolen and alarm means for sounding an alarm upon detection of breakage of the lock cable, in which electronic control means of the lock cable and the antitheft electronic control means are formed integral.

Since the antitheft apparatus for a vehicle according to the invention comprises connection means for electrically and mechanically connecting thereto a lock cable disengageable by a key operation for engaging the vehicle with a suitable structural member to prevent the same from being stolen and alarm means for sounding an alarm upon detection of breakage of the lock cable, in which electronic control means of the lock cable and the antitheft electronic control means are formed integral, both of the means can be disposed on the same substrate and in one package. Accordingly it is very difficult to place a physical load between the input and the output of the electronic control means of the lock cable and the antitheft electronic control means so that the capability of preventing theft can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFFERE EMBODIMENTS

A preferred embodiment of the invention will be described below with reference to the accompanying drawings.

Figure 1:
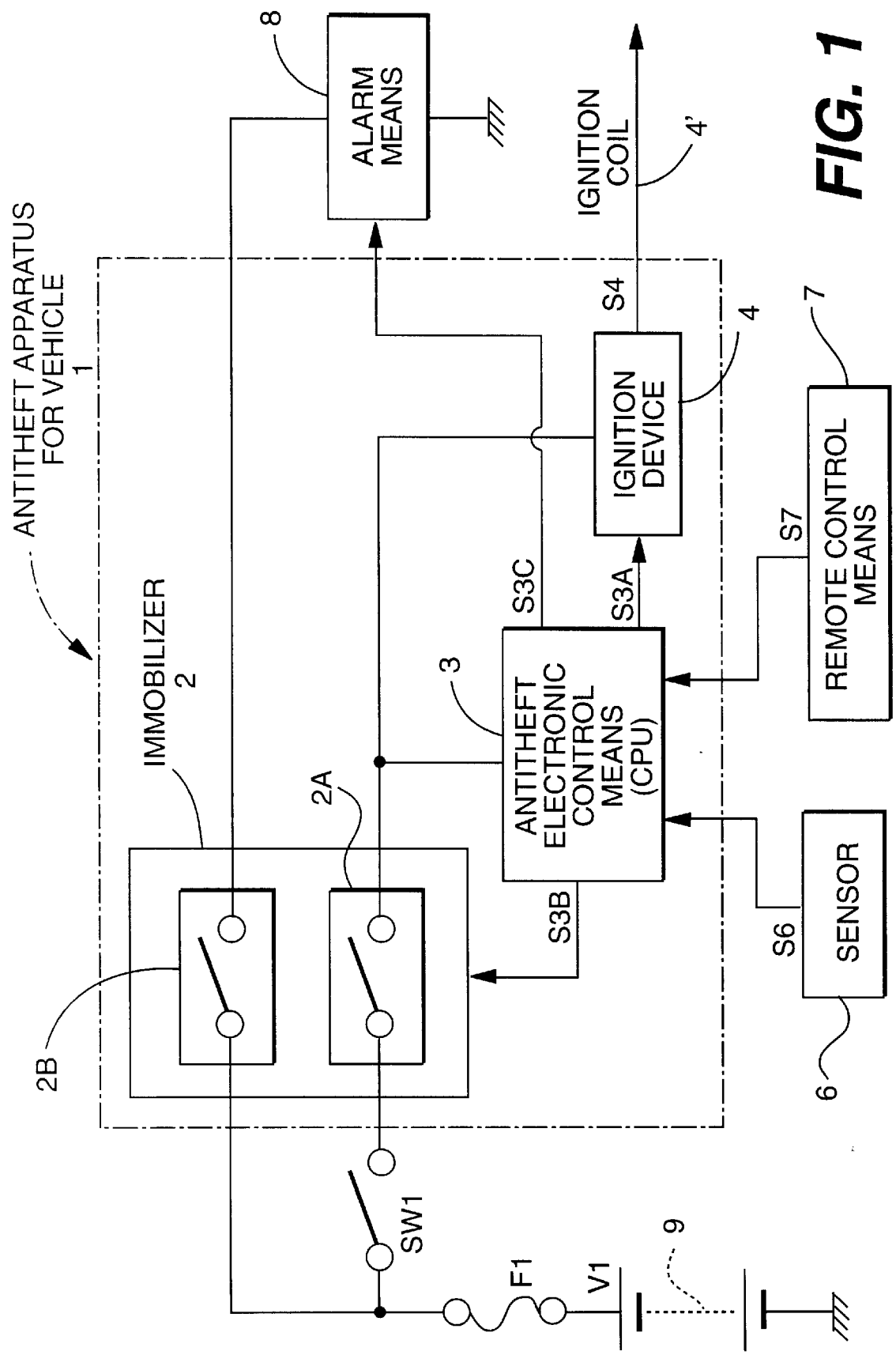
FIG. 1 is a general block diagram of an antitheft apparatus for a vehicle according to the invention.

Referring to FIG. 1, an antitheft apparatus for vehicle 1 includes an immobilizer 2, an antitheft electronic control means 3, an ignition device 4, a sensor 6, a remote control means 7 and an alarm means 8.

The antitheft electronic control means 3 is configured principally of a one-chip microcomputer (CPU) having functions of RAM, ROM, I/O control, interrupt control, timer, and the like and has an electronic control means for controlling ignition timing of the ignition device 4 and an electronic control means for controlling operation of the immobilizer 2 which are formed integral and disposed in one package.

The antitheft electronic control means 3 controls the immobilizer 2 and the alarm means 8 in response to a sensor signal S6 from the sensor 6 and a control signal S7 from the remote control means 7.

The immobilizer 2, in response to an immobilized control signal S3B from the CPU 10, on/off controls a switch means 2B to turn it on/off to thereby control the alarm means 8 to be rendered operable/inoperable and, further, the same on/off controls a switch means 2A to turn it on/off to thereby control the ignition device 4 to be rendered operable/inoperable.

As described above, the antitheft electronic control means 3 of the antitheft apparatus for vehicle 1 according to the invention has the electronic control means of the ignition device 4 and the electronic control means of the immobilizer 2 formed integral, and, hence, it can be disposed in one package.

Figure 2:
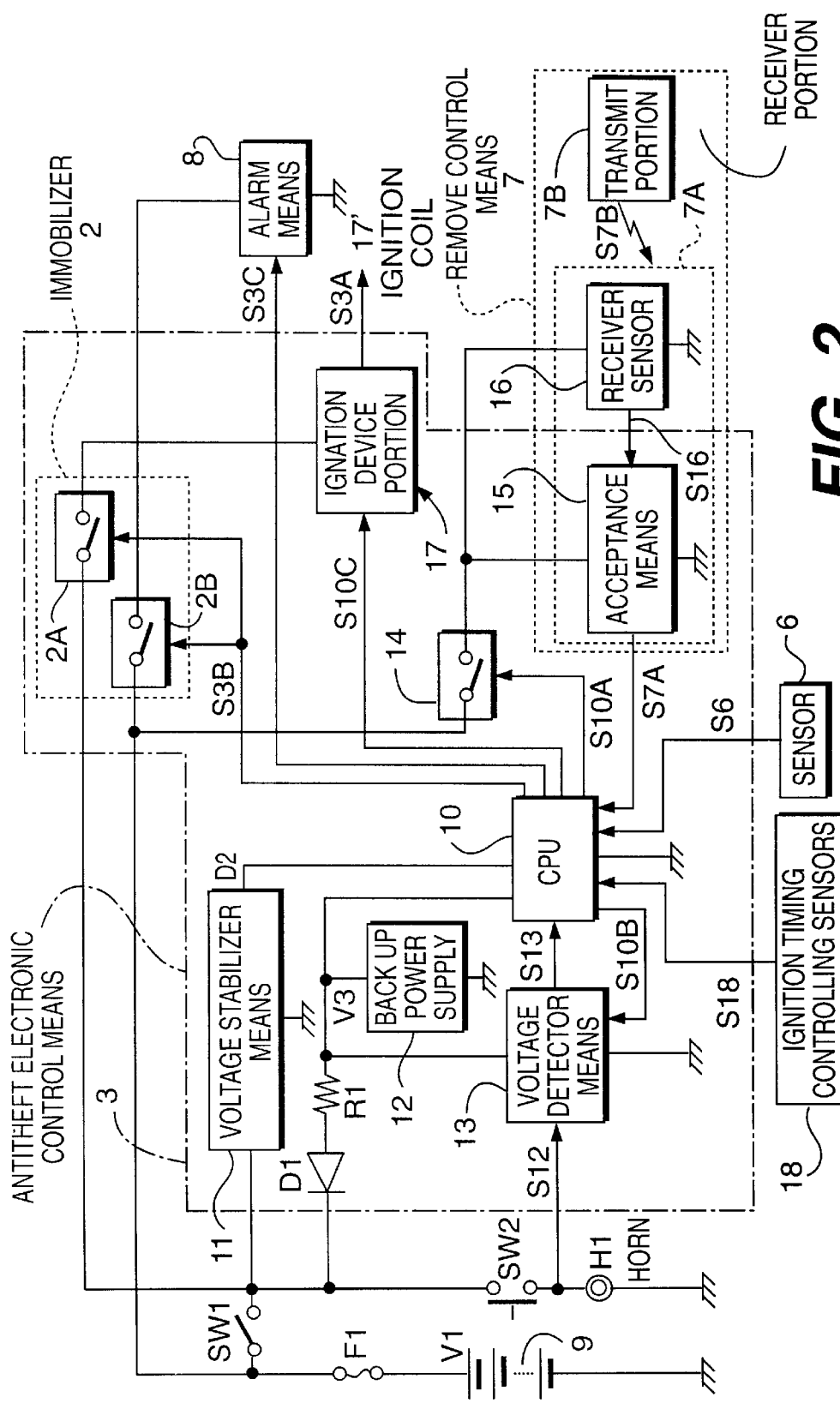
FIG. 2 is a block diagram of the principal portion of the antitheft apparatus for a vehicle according to the invention.

FIG. 2 is a block diagram of the principal portion of the antitheft apparatus for a vehicle according to the invention. Referring to FIG. 2, the antitheft electronic control means 3 includes the immobilizer 2, voltage stabilizer means 11, backup power supply 12, CPU (Central Processing Unit) 10, voltage detector means 13, switch means 14, acceptance means 15, ignition device portion 17, resistor R1, and diode D1.

Further, the antitheft electronic control means 3 has, on its periphery, the sensor 6, various ignition timing controlling sensors 18, transmit portion 7B, receive sensor 16, alarm means 8, on-vehicle battery 9, main switch SW1, and horn switch SW2.

The remote control means 7 is formed of a receiving portion 7A and a transmitting portion 7B, of which the receiving portion 7A is installed on the vehicle and the transmitting portion 7B is carried as a portable unit by the driver. By operation of the transmitting portion 7B, a control signal S7B is transmitted by means of an electric wave, supersonic wave, infrared ray, and the like.

The receive sensor 16 of the receiving portion 7A receives the control signal S7B transmitted from the transmit portion 7B and outputs a receive signal S16 to the acceptance means 15.

The acceptance means 15 of the receiver portion 7A is included in the antitheft electronic control means 3 and is formed integrally therewith. The acceptance means 15 accepts the receive signal S16 and outputs an acceptance signal S7A to the CPU 10.

As the CPU 10, a one-chip microcomputer having the functions of a RAM, ROM, I/O control, interrupt control, timer, and the like is used and it applies an error correcting process to the acceptance signal S7A from the acceptance means 15 and controls various apparatuses installed on the vehicle in accordance with the error-corrected acceptance signal S7A.

The sensor 6 installed on the vehicle includes a sensor detecting breakage of the lead wire connected to the main switch SW1, a vibration sensor for detecting a vibration of the vehicle, a supersonic sensor for detecting movement of the vehicle by means of supersonic waves, an infrared sensor for detecting movement of the vehicle by means of infrared rays, and the like and for outputting a sensor signal S6 to the CPU 10 upon detection of an unauthorized operation of the vehicle.

In order to prevent the stealing of the vehicle, the CPU 10, when the sensor 6 installed on the vehicle detects an unauthorized operation of the vehicle, outputs, in response to the sensor signal S6 output from the sensor 6, an immobilized control signal S3B to the switch means 2B of the immobilizer 2 to thereby turn the switch means 2B on so that power from the on-vehicle battery 9 is supplied to the alarm means 8 and, further, outputs an alarm control signal S3C to the alarm means 8 so that it gives an alarm.

Further, the CPU 10, in response to the sensor signal S6 outputted from the sensor 6, outputs the immobilized control signal S3B to the switch means 2A of the immobilizer 2 to turn the switch means 2A off so that the power supply from the on-vehicle battery 9 to the ignition device portion 17 is cut off and, further, brings the output of an ignition timing control signal S3A to the ignition coil to zero to thereby inhibit the ignition plug from igniting and makes it impossible for the engine to start.

When the main switch SW1 is on, the CPU 10 makes the alarm means 8 inoperable and the remote control means 7 inoperable, and when the main switch SW1 is off, the CPU 10, in response to the turning on of the mounted-electric-parts control switch (horn switch) SW2, causes the receiver portion 7A of the remote control means 7 to be operable for a predetermined period of time so as to be held in its stand-by state capable of receiving signal transmission from the transmit portion 7B. Then, the CPU 10, after holding the receiver portion 7A operable for the predetermined period of time, cuts off the power supply to the receiver portion 7A to thereby stop the operation of the receiver portion 7A.

The predetermined operable period of time of the receiver portion 7A of the remote control means 7 is preferably set to 60 seconds or so.

The voltage stabilizer means 11 of the antitheft electronic control means 3 produces a stabilized DC voltage V2 from a DC voltage V1 supplied from the on-vehicle battery 9 through a fuse F1 and the main switch SW1 and supplies the stabilized DC voltage V2 to the CPU 10.

Power for the receiver portion 7A of the remote control means 7 is supplied from the on-vehicle battery 9 through the switch means 14 and power for the alarm means 8 is supplied from the on-vehicle battery 9 through the switch means 2B.

When the main switch SW1 is on, the CPU 10 detects that the stabilized DC voltage V2 is applied to the power terminal of the CPU 10 and outputs a switch control signal S10A to the switch means 14 to turn off the switch means 14 so as to cut off the supply of the DC voltage V1 to the receiver portion 7A and render the receiver portion 7A inoperable and, further, outputs the immobilized control signal S3B to the switch means 2A to turn off the switch means 2A so as to cut off the supply of the DC voltage V1 to the alarm means 8 and renders the alarm means 8 inoperable.

Further, in order to reduce the load on the backup power supply 12, the CPU 10 outputs a control signal S10B to the voltage detector means 13 to thereby isolate the voltage detector means 13 from the backup power supply 12 or reset the same into a state consuming a minimum current.

When the main switch SW1 is off, the voltage supplied from the voltage stabilizer means 11 of the antitheft electronic control means 3 to the CPU 10 becomes zero and the CPU 10 is driven by a DC voltage V3 of the backup power supply 12. Then, the CPU 10 detects that the voltage at its power terminal is below a specified voltage and outputs a control signal S10B to the voltage detector means 13 to set the voltage detector means 13 into its operable state.

The DC voltage V3 of the backup power supply 12 is applied between the terminals of the horn switch SW2 through the resistor R1 and the diode D1. By turning on the horn switch SW2, a switch-on control signal S12 is inputed to the voltage detector means 13.

The diode D1, when the main switch SW1 is on, prevents application of the DC voltage V1 to the backup power supply 12 and the CPU 10, while the resistor R1 prevents an overcurrent flowing from the backup power supply 12 by turning on of the horn switch SW2.

As the switch for inputting the switch-on control signal S12 to the voltage detector means 13, a switch other than the horn switch SW2, except for the main switch SW1, may be used.

The voltage detector means 13, in response to the switch-on control signal S12, outputs a timer starting signal S13 to the CPU 10.

The CPU 10, in response to the timer starting signal S13, starts the timer operation and outputs a switch control signal S10A to the switch means 14 so that the switch means 14 is held in its on state for a predetermined period of time until the timer operation is ended.

The receiver portion 7A is supplied with the DC voltage V1 from the on-vehicle battery 9 through the switch means 14 and rendered capable of signal reception for a predetermined period of time, and, upon receiving a control signal S7B from the transmit portion 7B, outputs an acceptance signal S7A to the CPU 10.

When the acceptance signal S7A from the acceptance means 15 is an instruction signal to set the alarm means 8, the CPU 10, in order that the DC voltage V1 from the on vehicle battery 9 is supplied to the alarm means 8 and the alarm means 8 is rendered operable, outputs an immobilized control signal S3B to the switch means 2B of the immobilizer 2 to turn on the switch means 2B.

The CPU 10, when a predetermined period of time has passed according to the timer operation of the CPU 10, outputs a switch control signal S10A to turn off the switch means 14 and render the receiver portion 7A inoperable.

As described in the foregoing, the antitheft electronic control means 3 of the antitheft apparatus for vehicle 1 has the immobilizer 2, voltage stabilizer means 11, backup power supply 12, CPU 10, voltage detector means 13, switch means 14, acceptance means 15, ignition device portion 17, and the like formed integral and, therefore, it can be disposed in one package. Further, continuously flowing of the operating current into the receiver portion is prevented and, thereby, the load on the on-vehicle battery can be reduced.

To release the alarm means of the antitheft apparatus for a vehicle by the remote control means, it is required to render the receiver portion of the remote control means capable of signal reception by performing a predetermined switch operation, and, thereby, the theft preventing capability can be improved.

Figure 3:
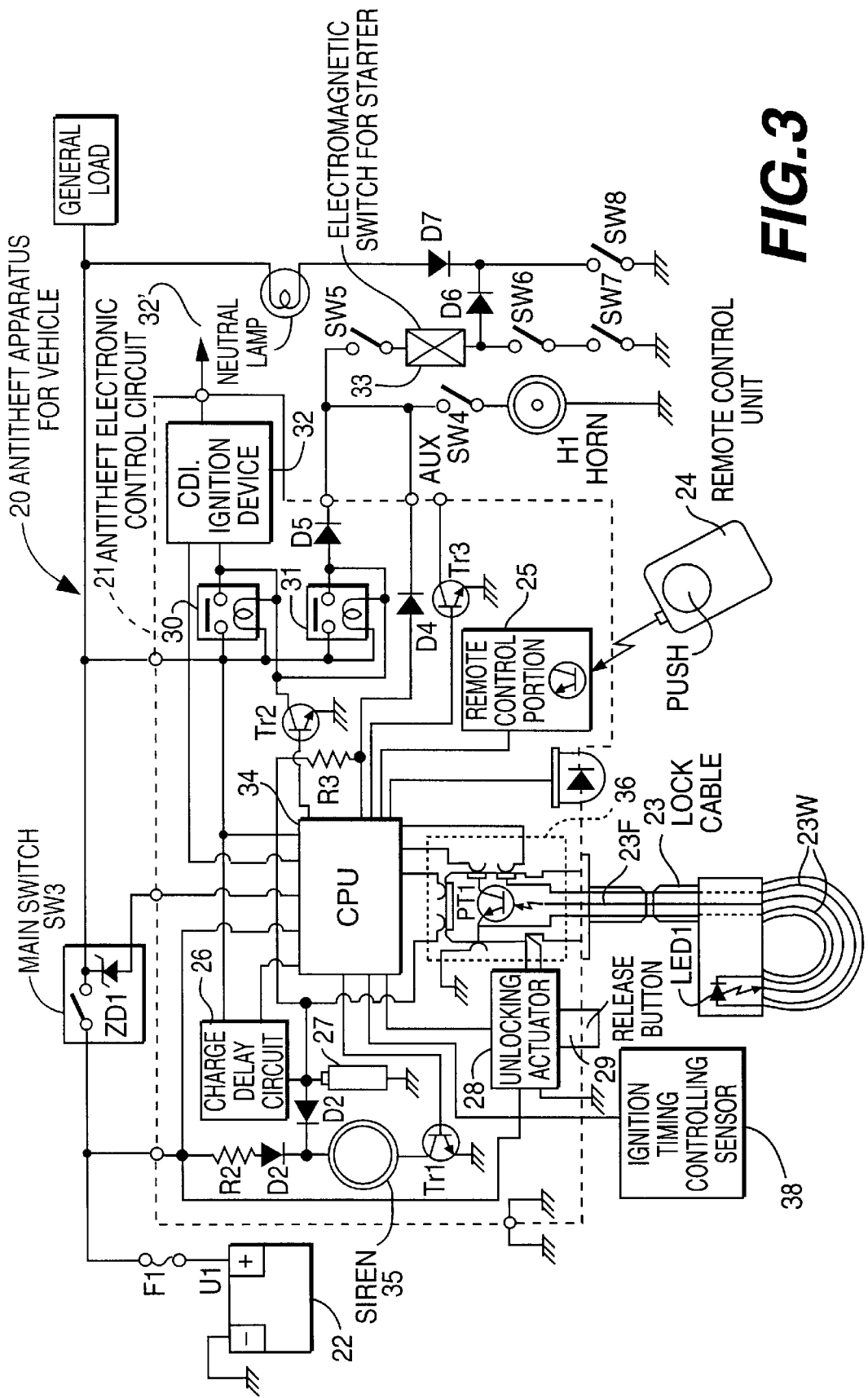
FIG. 3 is a block diagram of the principal portion of the antitheft apparatus for a vehicle provided with a lock cable according to the invention.

FIG. 3 is a block diagram of the principal portion of the antitheft apparatus for a vehicle provided with a lock cable according to the invention. Referring to FIG. 3, the antitheft apparatus for vehicle 20 includes an antitheft electronic control means 21 and a lock cable 23.

The antitheft electronic control means 21 includes a remote control portion 25, a charger delay circuit 26, a backup power supply 27, an unlocking actuator 28, a release button 29, a switch means 30, a switch means 31, an ignition device 32 such as CDI, a CPU 34, a siren 35, a connection means 36, resistors (R2, R3), diodes (D2, D3, D4, D5), and transistors (Tr1, Tr2, Tr3).

The lock cable 23 includes a light emitting diode LED1, an optical fiber cable 23F, an electric wire 23W, and a phototransistor PT1 within the cable.

The antitheft apparatus for a vehicle 20 has, on its periphery, a remote control unit (transmitter portion) 24, an on-vehicle battery 22, a main switch SW3, a horn switch SW4, a horn H1, a starter switch SW5, a starting electromagnetic switch 33, a clutch switch SW6, a side stand switch SW7, a neutral lamp L, a neutral lamp switch SW8, diodes (D6, D7), and general loads.

When the main switch SW3 is turned off, the CPU 34 changes the transistor Tr2 into its cutoff state and turns off the switch means 30 and switch means 31. Thereby, the power supply lines connecting the on-vehicle battery 22 with the ignition device 32 and the starter electromagnetic switch 33 through the main switch SW1 3 are electrically opened so that engine ignition and motor operation are inhibited.

Further, providing the CPU 34 with a timer function, it may be adapted such that the transistor Tr2 is cut off when 10 seconds or so have passed after the main switch SW3 was turned off and, thereby, the engine ignition and motor operation are inhibited.

When the lock cable 23 is set in the connection means 36 of the antitheft apparatus for a vehicle 20, the connection means 36 applies a bias to the phototransistor PT1 of the lock cable 23 and supplies a forward current to the light emitting diode LED1 through the electric wire 23W so that the same is caused to emit light and the emitted light is received by the phototransistor PT1 through the optical fiber cable 23F.

When the lock cable 23 is set in the connection means 36 of the antitheft apparatus for vehicle 20, the CPU 34 detects that the lock cable 23 is set in the connection means 36 and controls the unlocking actuator 28 such that the release button 29 is restrained and the setting of the lock cable 23 in the connection means 36 cannot be unlocked.

When the lock cable 23 is broken, it follows that the electric wire 23W and the optical fiber cable 23F are also broken. Then, the optical input to the phototransistor PT1 is stopped and the phototransistor PT1 is put into its cutoff state. This fact is detected by the CPU 34 and the transistor Tr1 is driven to be turned on. Thus, a current is supplied from the on-vehicle battery 22 to the siren 35 through the resistor R2 and the diode D2 so that an alarm sound is emitted.

If the lock cable is broken, the alarm sound by the siren 35 is not stopped even if the lock cable is connected again. In order to detect breakage of the lock cable 23 more positively, the forward current passed through the LED1 may be modulated to thereby modulate the emitted light therefrom so that a tricking operation by the use of a bypass circuit or the like after breakage of the lock cable 23 is made difficult.

When the main switch SW3 is turned on while the inhibition of engine ignition and motor operation is not released, the CPU 34 drives the transistor Tr1 to turn on and allows current to flow from the on-vehicle battery 22 to the siren 35 through the resistor R2 and the diode D2 to cause an alarm sound to be made, and when the main switch SW3 is turned off, it puts the transistor Tr1 into its cutoff state and stops the alarm sound.

The remote control portion (receiver portion) 25 is held operable for a predetermined period of time set by the timer operation of the CPU 34 after a specific switch of the vehicle (the horn switch SW4 in the present embodiment) was operated and enabled to receive instructions from the remote control unit (transmit portion) 24.

When the remote control portion 25, while it is ready to receive signals, has received an instruction signal from the remote control unit 24, the antitheft apparatus for a vehicle 20 can release the inhibition of the engine ignition and motor operation in accordance with the received instruction signal.

In the case where the engine is not started within the predetermined period of time set by the timer operation of the CPU 34 after the inhibition of the engine ignition and motor operation was released, the engine ignition and motor operation are inhibited again after the predetermined period of time has passed.

In the antitheft apparatus for a vehicle 20, when the remote control portion 25 has received an instruction signal from the remote control unit 24 while it is ready to receive signals, the CPU 34, in response to the received instruction signal, controls the unlocking actuator 28 to remove restrictions on the release button 29. Then, by depressing the release button 29, the lock cable 23 can be unlocked from the connection means 36.

In the case where the lock cable 23 is not unlocked from the connection means 36 within the predetermined period of time set by the timer operation of the CPU 34 after the restrictions on the release button 29 are removed by the unlocking actuator 28, the release button 29 is placed under restrictions again after the predetermined period of time has passed.

As described in the foregoing, the antitheft apparatus for a vehicle 20 comprises the lock cable 23, connection means 36, charger delay circuit 26, backup power supply 27, unlocking actuator 28, release button 29, CPU 34, switch means 30, switch means 31, CDI ignition device 32, electromagnetic switch for starter 33, remote control portion 25, resistor R2, resistor R3, diode D2, diode D3, diode D4, transistor Tr1, transistor Tr2, and the transistor Tr3, and, hence, the capability of preventing theft can be improved while the operating current is prevented from continuously flowing into the remote control portion 25 and thereby the load on the on-vehicle battery is lightened.

Further, the above described antitheft apparatus for a vehicle may be adapted such that a stand lock device is provided on the main stand, a control portion is provided in the body of a vehicle, and locking or unlocking of the stand lock device can be achieved by remote control with a remote control unit.

In the described antitheft apparatus for a two-wheel or three-wheel vehicle, the main stand is locked by the stand lock device with the main stand in its erected position. Therefore, even if it is attempted to move the vehicle as it is, the main stand touching the road face interferes with the movement and, hence, the theft of the vehicle can be prevented.

The antitheft apparatus for vehicle may further be provided with a steering wheel lock unit for locking or unlocking the steering wheel so that the steering wheel can be locked or unlocked.

In the described antitheft apparatus for vehicle, the steering wheel is fixed and held unrotatable when the steering wheel lock unit is in its locked state and theft of the vehicle is thereby prevented.

Further, the above described antitheft apparatus for a vehicle may be provided with a lock means which makes it impossible to change gears from a low gear if the gear is set in low gear when the vehicle is parked and adapted such that the lock means is locked or unlocked by remote control using a remote control unit.

Since, in the antitheft apparatus for a vehicle provided with the above described lock means, an igniting operation is inhibited by the immobilizer when theft of the vehicle is detected, it is required for the thief to walk pushing the vehicle with its gear set in low gear, and, besides, the siren which will keep sounding, the theft of the vehicle becomes very difficult.

The above described mode for carrying out the invention is just an embodiment and the invention is not limited to the above described mode.

The present invention with the above described configuration has the following effects. The invention comprises an antitheft electronic control means integrally formed of electronic control means for preventing the theft of a vehicle in response to a detection signal of an unauthorized operation of the vehicle and electronic control means for controlling ignition timing of the ignition device for starting the vehicle engine, and the antitheft electronic control means can be disposed on the same substrate and in one package. Therefore, an antitheft apparatus for a vehicle which is small, highly capable of preventing theft, and available at a low cost can be provided which is constructed of commonly usable component parts.

The present invention has an antitheft electronic control means integrally formed with an electronic circuit portion of the receiver portion of a remote controlled means for making the antitheft apparatus for a vehicle operable/inoperable and both of the members can be disposed on the same substrate and in one package. Therefore, it is very difficult to place a physical load between the input and the output of the antitheft electronic control means and the electronic circuit portion of the receiver portion. Accordingly, an antitheft apparatus for a vehicle can be provided which is small, quite operable, and highly capable of preventing theft.

Further, the present invention comprises lock means for engaging a structural member of the vehicle with another structural member of the vehicle or a structural member of a body other than the vehicle, lock control means for controlling the lock means, and alarm means for sounding an alarm upon detection of unauthorized unlocking of the lock means, and has the lock control means integrally formed with the antitheft electronic control means and can have the lock control means and the antitheft electronic control means disposed on the same substrate and in one package. Therefore, it is very difficult to place a physical load between the input and the output of the lock control means and the antitheft electronic control means. Accordingly, an antitheft apparatus for a vehicle having a high capability for preventing theft and a high reliability can be provided.

Further, the present invention comprises connection means for connecting thereto electrically and mechanically a lock cable unlockable by a key operation for engaging the vehicle with a suitable structural member for preventing theft of the vehicle and alarm means for sounding an alarm upon detection of the breakage of the lock cable and has the electronic control means of the lock cable and the antitheft electronic control means formed integrally and can have them disposed on the same substrate and in one package. Therefore, it can be made very difficult to place a physical load between the input and the output of the electronic control means of the lock cable and the antitheft electronic control means and, accordingly, an antitheft apparatus for a vehicle having higher capability of preventing theft and higher reliability can be provided.

Therefore, an antitheft apparatus can be provided for a vehicle which is small, available at low cost, highly capable of preventing theft, and highly reliable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An antitheft apparatus for detecting an unauthorized operation of a vehicle and thereupon functioning to prevent the vehicle from being stolen, said antitheft apparatus comprising:

antitheft electronic control means responsive to a signal generated upon detection of an unauthorized operation of a vehicle for preventing the vehicle from being stolen;

electronic ignition timing control means for controlling authorized ignition timing of an ignition device for starting the engine of the vehicle; and said antitheft electronic control means being packaged and integrally formed together with said electronic ignition timing control means for preventing unauthorized tampering with either one of said antitheft electronic control means and said electronic ignition control means.

2. The antitheft apparatus according to claim 1, wherein said antitheft electronic control means further includes an electronic circuit portion of a receiver portion of a remote control means for controlling said antitheft apparatus to be at least one of operable and inoperable.

3. The antitheft apparatus according to claim 1, said antitheft apparatus further includes lock means for engaging a structural member of the vehicle to at least one of another structural member of the vehicle and a structural member of a body other than the vehicle, lock control means for controlling said lock means, and alarm means for sounding an alarm upon detection of unauthorized unlocking of said lock means, wherein said lock control means and said antitheft electronic control means are formed integrally.

4. The antitheft apparatus according to claim 2, said antitheft apparatus further includes lock means for engaging a structural member of the vehicle to at least one of another structural member of the vehicle and a structural member of a body other than the vehicle, lock control means for controlling said lock means, and alarm means for sounding an alarm upon detection of unauthorized unlocking of said lock means, wherein said lock control means and said antitheft electronic control means are formed integrally.

5. The antitheft apparatus according to claim 3, said antitheft apparatus further includes connection means for electrically and mechanically connecting thereto a lock cable disengageable by a key operation for engaging the vehicle with a suitable structural member to prevent the same from being stolen and alarm means for sounding an alarm upon detection of breakage of said lock cable, wherein electronic control means of said lock cable and said antitheft electronic control means are formed integrally.

6. The antitheft apparatus according to claim 4, said antitheft apparatus further includes connection means for electrically and mechanically connecting thereto a lock cable disengageable by a key operation for engaging the vehicle with a suitable structural member to prevent the same from being stolen and alarm means for sounding an alarm upon detection of breakage of said lock cable, wherein electronic control means of said lock cable and said antitheft electronic control means are formed integrally.

7. The antitheft apparatus according to claim 1, wherein said antitheft electronic control means includes an electronic circuit portion of a receiving portion of a remote control means for controlling the antitheft apparatus, said antitheft electronic control means and said electronic circuit portion of a receiving portion of a remote control means being formed on a single substrate.

8. The antitheft apparatus according to claim 7, wherein forming said antitheft electronic control means and said electronic circuit portion of a receiving portion of a remote control means for controlling the antitheft apparatus on a single substrate ensures against unauthorized tampering with an input and output of the antitheft electronic control means and the electronic circuit portion of the receiving portion.

9. The antitheft apparatus according to claim 3, wherein said lock control means and said antitheft electronic control means are formed on a single substrate.

10. The antitheft apparatus according to claim 9, wherein forming said lock control means and said antitheft electronic control means on a single substrate ensures against unauthorized tampering with an input and output of the lock control means and the antitheft electronic control means.

11. The antitheft apparatus according to claim 5, wherein said electronic control means of said lock cable and said antitheft electronic control means are formed on a single substrate.

12. The antitheft apparatus according to claim 11, wherein forming said electronic control means of said lock cable and said antitheft electronic control means on a single substrate ensures against unauthorized tampering with an input and output of the electronic control means of the lock cable and the antitheft electronic control means.

13. A method for preventing the theft of a vehicle by detecting an unauthorized operation of a vehicle and thereupon functioning to prevent the vehicle from being stolen, said method comprising the following steps:

providing an antitheft electronic control means for responding to a signal generated upon detection of an unauthorized operation of a vehicle for preventing the vehicle from being stolen;

providing an electronic ignition timing control means for controlling authorized ignition timing of an ignition device for starting the engine of the vehicle; and preventing the starting of the engine of the vehicle based on signals supplied from said antitheft electronic control member to said electronic ignition timing control means, said antitheft electronic control means being packaged and integrally formed together with said electronic ignition timing control means for preventing unauthorized tampering of either one of said antitheft electronic control means and said electronic ignition control means.

14. The method for preventing the theft of a vehicle according to claim 13, and further including the step of providing an electronic circuit portion of a receiver portion of a remote control member for controlling the antitheft electronic control means to be at least one of operable and inoperable.

15. The method for preventing the theft of a vehicle according to claim 13, and further including the step of providing a lock member for engaging a structural member of the vehicle to at least one of another structural member of the vehicle and a structural member of a body other than the vehicle, and providing a lock control means for controlling said lock member, and providing an alarm means for sounding an alarm upon detection of unauthorized unlocking of said lock member, wherein said lock control means and said antitheft electronic control means are formed integrally.

16. The method for preventing the theft of a vehicle according to claim 14, and further including the step of providing a lock member for engaging a structural member of the vehicle to at least one of another structural member of the vehicle and a structural member of a body other than the vehicle, and providing a lock control means for controlling said lock member, and providing an alarm means for sounding an alarm upon detection of unauthorized unlocking of said lock member, wherein said lock control means and said antitheft electronic control means are formed integrally.

17. The method for preventing the theft of a vehicle according to claim 15, and further providing a connection member for electrically and mechanically connecting thereto a lock cable disengageable by a key operation for engaging the vehicle with a suitable structural member to prevent the same from being stolen and providing an alarm means for sounding an alarm upon detection of breakage of said lock cable, wherein an electronic control means for said lock cable and said antitheft electronic control means are formed integrally.

18. The method for preventing the theft of a vehicle according to claim 16, and further including the step of providing an electronic circuit means for a receiving portion of a remote control member for controlling the antitheft electronic control means and forming the antitheft electronic control means and said electronic circuit means being formed on a single substrate.

19. The method for preventing the theft of a vehicle according to claim 13, wherein forming said antitheft electronic control means and said electronic circuit means on a single substrate ensures against unauthorized tampering with an input and output of the antitheft electronic control member and the electronic circuit portion of the receiving portion.

20. The method for preventing the theft of a vehicle according to claim 15, and further including the step of forming said lock control means and said antitheft electronic control means on a single substrate.

21. The method for preventing the theft of a vehicle according to claim 20, wherein forming said lock control means and said antitheft electronic control means on a single substrate ensures against unauthorized tampering with an input and output of the lock control means and the antitheft electronic control means.

22. The method for preventing the theft of a vehicle according to claim 15, and further including the step of forming the electronic control means of said lock cable and said antitheft electronic control means on a single substrate.

23. The method for preventing the theft of a vehicle according to claim 22, wherein forming said electronic control means of said lock cable and said antitheft electronic control means on a single substrate ensures against unauthorized tampering with an input and output of the electronic control means of the lock cable and the antitheft electronic control means.

* * * * *